Reissued Apr. 19, 1927.

Re. 16,598

UNITED STATES PATENT OFFICE.

CARL HAMBUECHEN, OF ST. LOUIS, MISSOURI, ASSIGNOR TO ELECTRO METALLURGICAL COMPANY, A CORPORATION OF WEST VIRGINIA.

ELECTRODEPOSITION OF CHROMIUM.

No Drawing. Original No. 1,544,451, dated June 30, 1925, Serial No. 724,515, filed July 5, 1924. Application for reissue filed April 9, 1926. Serial No. 101,000.

This invention is a process for electrodepositing chromium. The object is to provide an improved process easier of execution and capable of giving deposits of better quality. This object is attained by the use of an electrolyte of novel composition. A novel arrangement of anodes is also included in the invention.

As electrolyte I employ an aqueous solution of chromic acid to which has been added a small quantity of a fluorid, such as chromium, iron, ammonium or sodium fluorid. The electrolyte is preferably free from strong mineral acids such as sulphuric and hydrochloric.

To prepare the electrolyte I merely dissolve pure chromic acid in water in the proportion of about 200 to 600 grams per liter of solution, and add about 10 to 50 grams of sodium fluorid or an amount of another metal fluorid containing an equal quantity of fluorin to each liter of the solution. Very good results have been obtained with an electrolyte containing 300 grams of $CrO_3$ per liter. The deposition may be carried out at room temperature or above. Temperatures below 50° C. are preferred. Cathode current densities of 50 to 300 amperes per square foot have given good results.

If a small amount of sulphuric acid is added to electrolyte prepared as described above, the electrolyte does not become totally inoperative, but the current efficiency is greatly diminished, at times falling to less than half its former value. I therefore prefer to exclude sulphuric acid from the bath. Hydrofluoric acid is not the equivalent of a metal fluorid in the present invention. Two baths of the same chromium concentration, to which the same amount of fluorin had been added, in one case as sodium fluorid and in the other case as hydrofluoric acid, were compared. The current efficiency of the sodium fluorid bath was almost double that of the other bath while the voltage required was much less than half. The bath containing hydrofluoric acid accordingly consumed more than four times as much power per gram of chromium deposited.

The electrolyte of my invention can be used in conjunction with insoluble anodes of materials such as lead and lead peroxid. It is of course necessary to replenish the bath from time to time with additions of chromic acid. In attempting to operate with chromium anodes, I have found that the current efficiency at the anode greatly exceeds that at the cathode, causing the chromium content of the bath to increase continuously, raising the voltage, and diminishing the current efficiency. The same effect has been observed with other electrolytes proposed for the deposition of chromium. I avoid this difficulty by the use of both insoluble anodes and soluble chromium anodes.

The two anodes may be introduced into the circuit alternately for such periods as will not permit the chromium content of the bath to rise above or fall below the desired range, but I prefer to connect the two anodes electrically in parallel and immerse them in the bath simultaneously. It is impossible to state what ratio of insoluble anode surface to soluble anode surface will maintain the bath in constant condition under all circumstances, since this ratio may vary with the desired chromium concentration in the bath, with the anode current density and its relation to the cathode current density, with the temperature of the bath, etc. The proper ratio for a particular arrangement is readily found by trial. With a chromium anode having a surface equal to the cathode surface, anode current efficiencies about six times as great as the cathode current efficiency have often been observed. The replacement of about five-sixths of the anode surface with insoluble material, such as lead, is therefore indicated, and has been found to give good results. The best ratio may, however, be considerably more or less than this, particularly when the total anode surface is not approximately equal to the cathode surface.

Having now described my invention, I claim:

1. A bath for electrodepositing chromium, containing chromic acid in excess and a soluble metal fluorid, and being substantially free from acids other than chromic.

2. A bath for electrodepositing chromium containing per liter 200 to 600 grams of chromic acid and 10 to 50 grams of an alkali metal fluorid, and being substantially free from acids other than chromic.

3. A bath for electrodepositing chromium containing chromic acid and 10 to 50 grams of sodium fluorid per liter, and being substantially free from acids other than chromic, and from sulphates.

4. Process of electrodepositing chromium from a bath containing chromic acid which comprises passing the depositing current into the bath through a soluble anode containing chromium, and an insoluble anode, and adjusting the distribution of the current between the two anodes to maintain an efficient concentration of chromium in the bath.

5. Process of electrodepositing chromium from a bath containing chromic acid which comprises passing the depositing current into the bath simultaneously through a soluble anode containing chromium, and an insoluble anode, and adjusting the surfaces of the two anodes to maintain an efficient concentration of chromium in the bath.

6. Process according to claim 5 in which the insoluble anode contains lead.

7. Process of electrodepositing chromium from a bath containing chromic acid and an alkali metal fluorid, which comprises passing the depositing current into the bath through a soluble anode containing chromium, and an insoluble anode, and adjusting the surfaces of the two anodes and the times of their immersion to maintain an efficient concentration of chromium in the bath.

8. Process of electrodepositing chromium from a bath containing chromic acid and a metal fluorid, which comprises passing the depositing current into the bath through a soluble anode containing chromium, and an insoluble anode, and adjusting the surfaces of the two anodes and the times of their immersion to maintain an efficient concentration of chromium in the bath.

In testimony whereof, I affix my signature.

CARL HAMBUECHEN.